April 18, 1939.  L. S. FLECK ET AL  2,154,673
RECLAMATION OF METALS
Filed Aug. 23, 1935   6 Sheets-Sheet 4
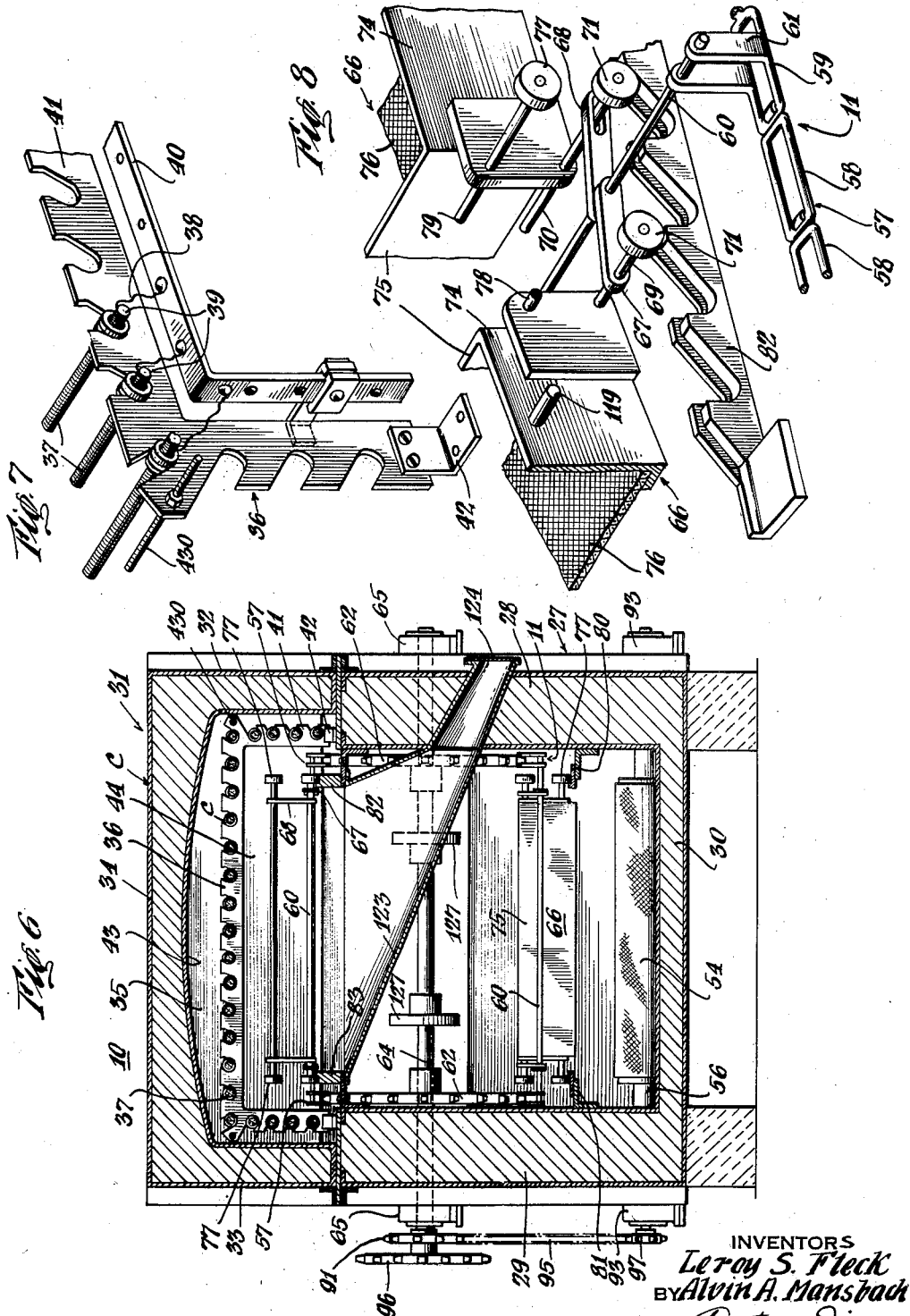
INVENTORS
Leroy S. Fleck
BY Alvin A. Mansbach
Austin + Dix
ATTORNEYS April 18, 1939. L. S. FLECK ET AL 2,154,673
RECLAMATION OF METALS
Filed Aug. 23, 1935 6 Sheets-Sheet 5
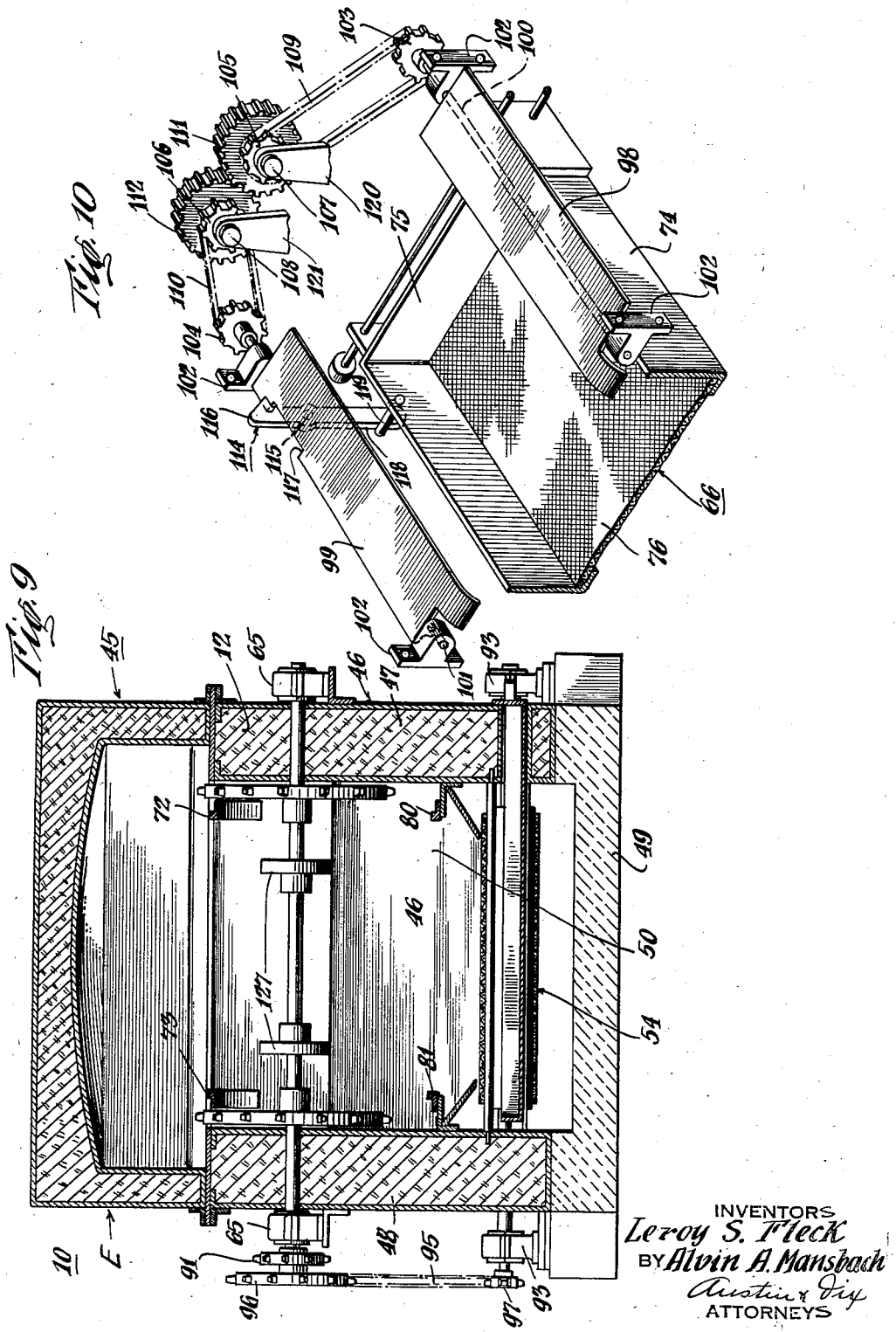
INVENTORS
Leroy S. Fleck
BY Alvin A. Mansbach
Austin & Dix
ATTORNEYS April 18, 1939.　　L. S. FLECK ET AL　　2,154,673
RECLAMATION OF METALS
Filed Aug. 23, 1935　　6 Sheets-Sheet 6
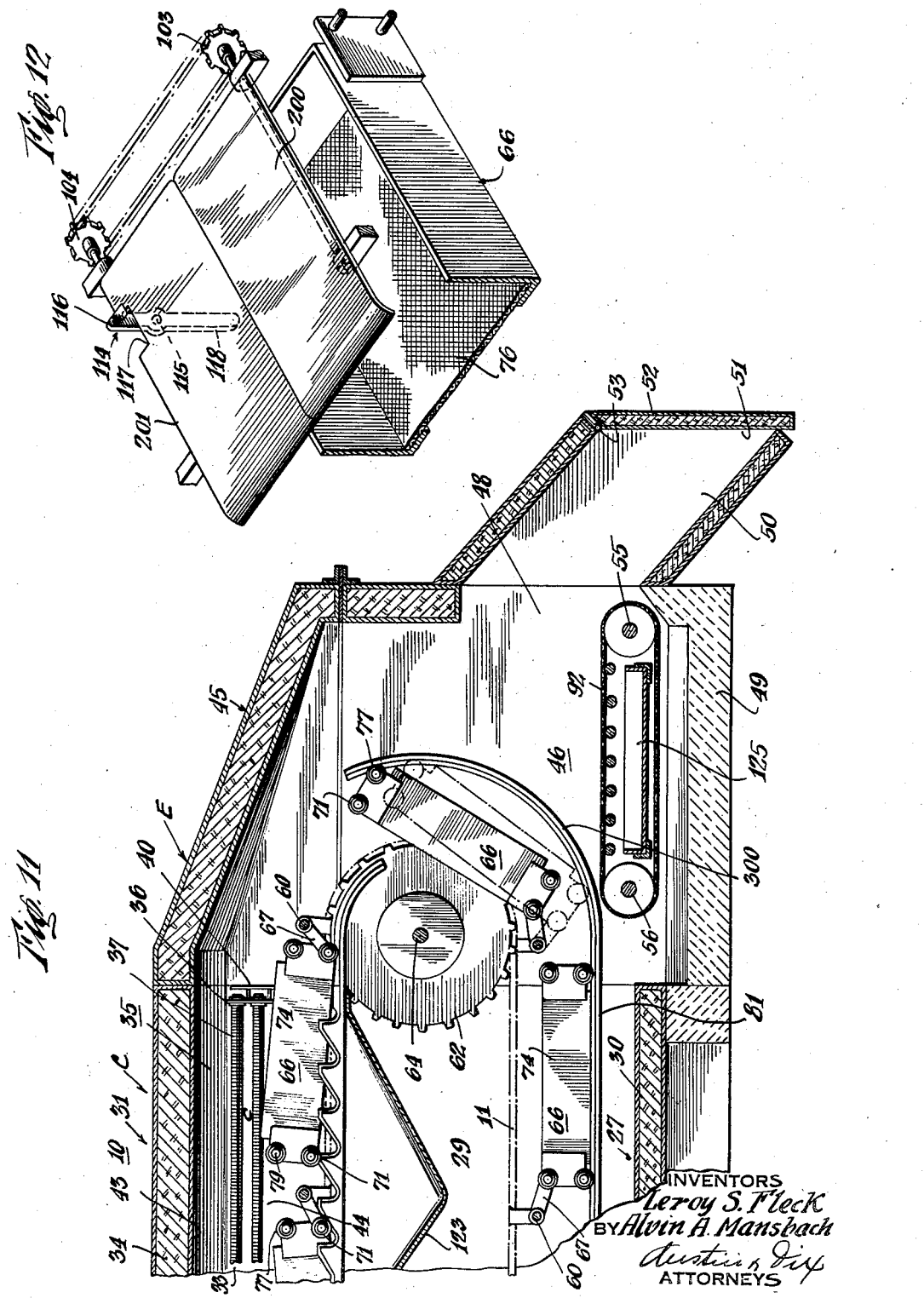

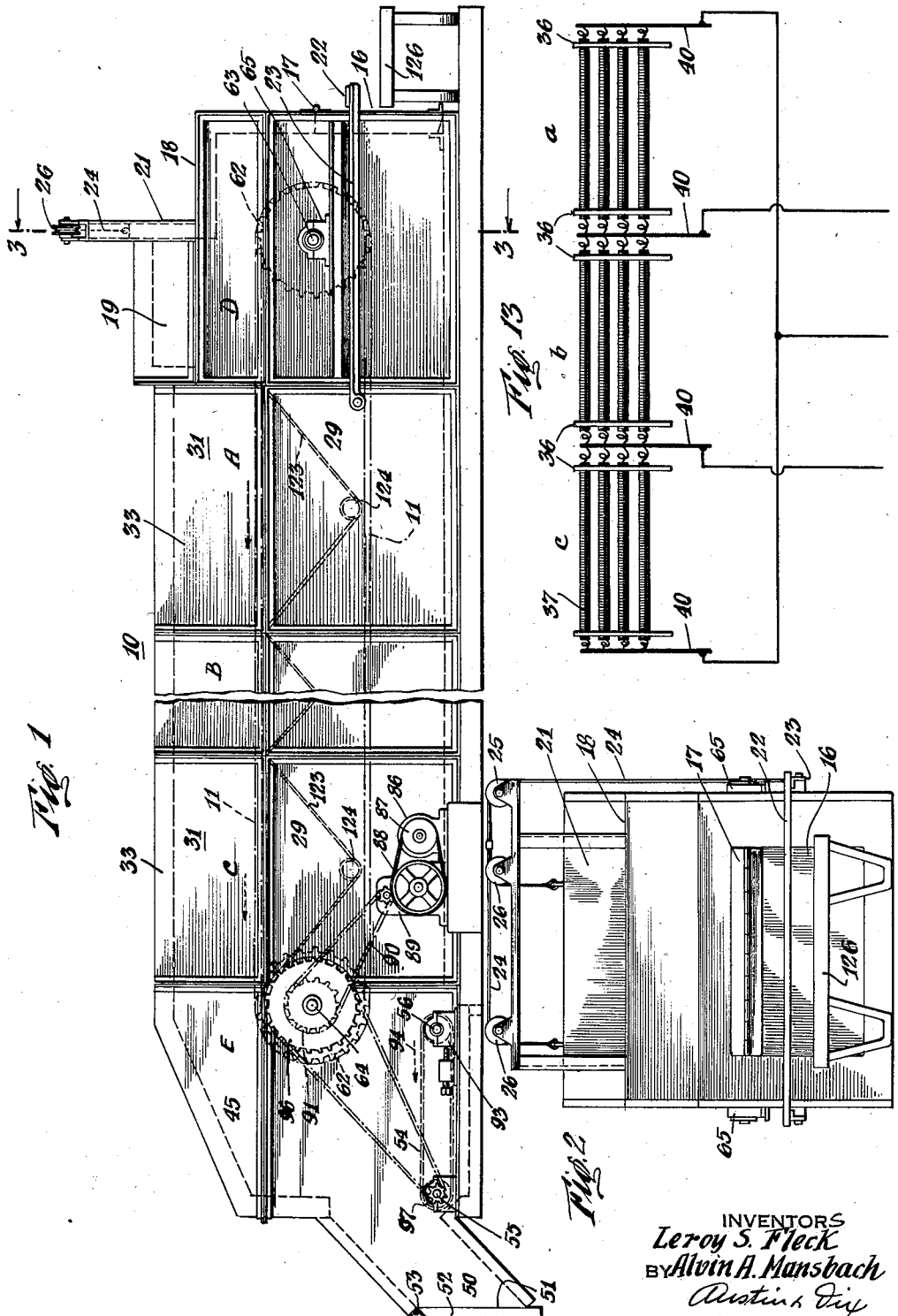

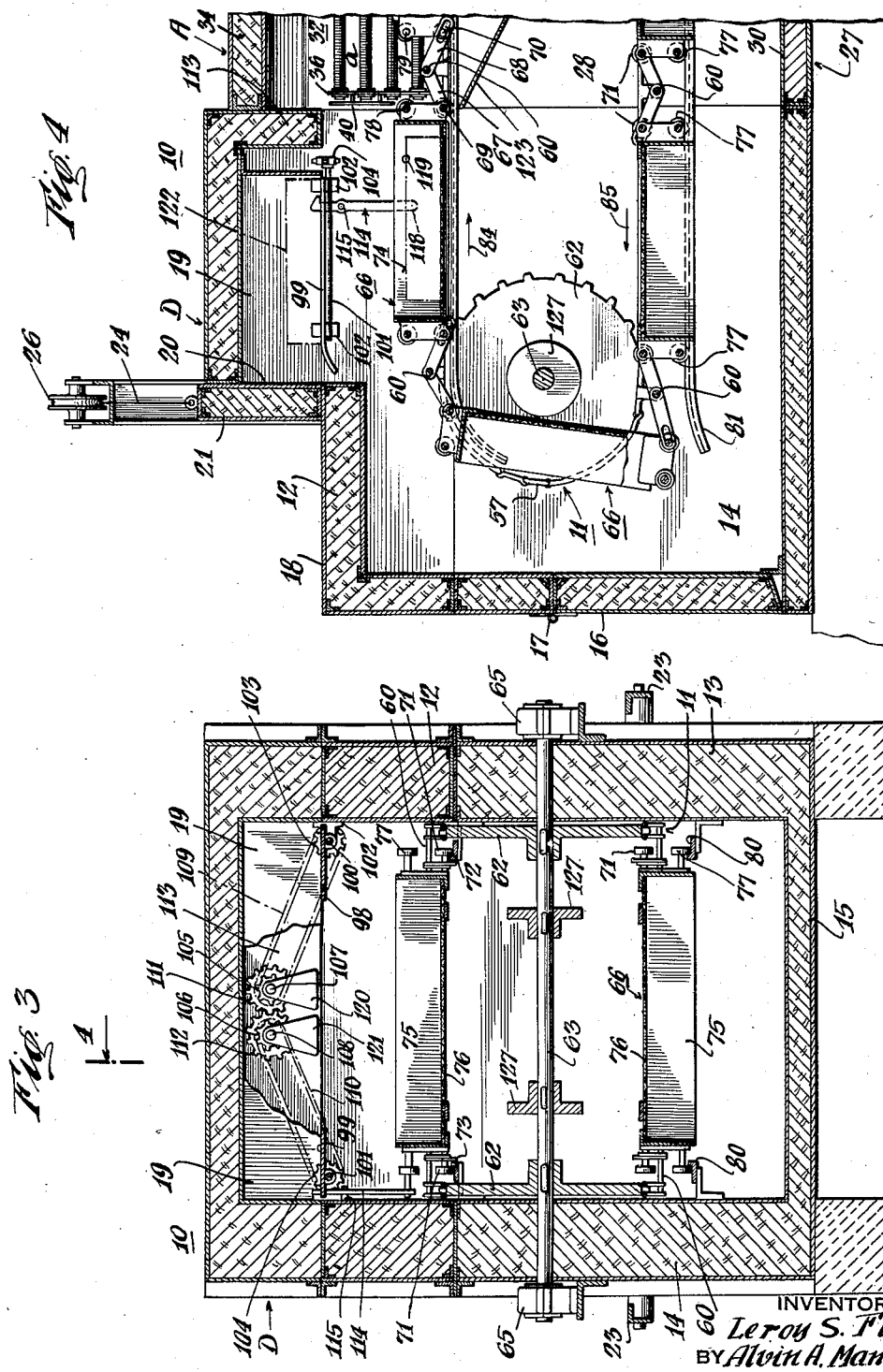

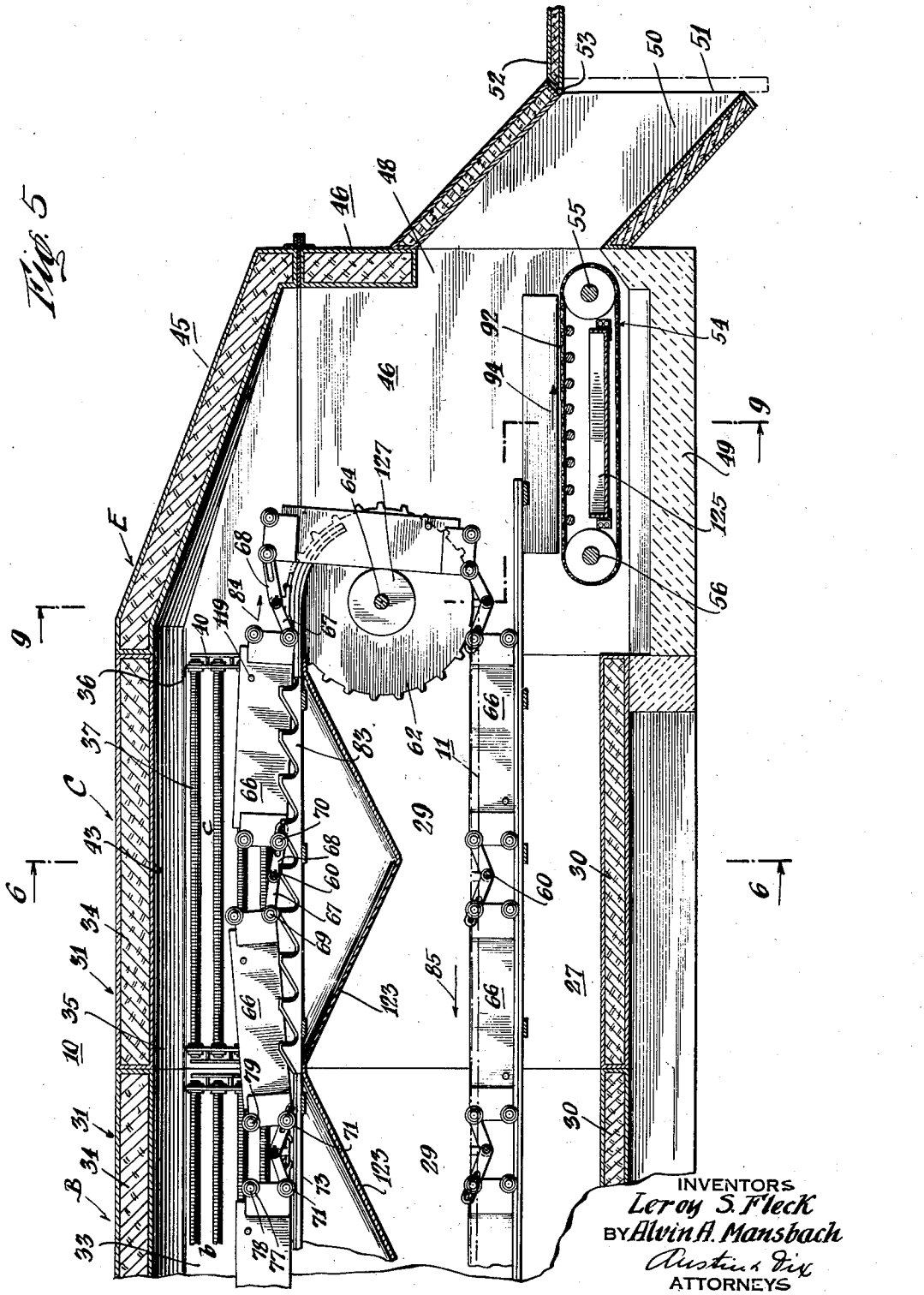

Patented Apr. 18, 1939

2,154,673

UNITED STATES PATENT OFFICE 2,154,673

RECLAMATION OF METALS

Leroy S. Fleck and Alvin A. Mansbach, New York, N. Y.

Application August 23, 1935, Serial No. 37,574

20 Claims. (Cl. 75—63)

This invention relates generally to the reclamation of used metals.

Broadly the invention contemplates the separation of comparatively low melting point metals and alloys from comparatively high melting point metals and alloys primarily for the purpose of reclaiming the same in such form as to render the metallic materials more valuable than in their combined form while at the same time reducing what might otherwise represent a large economic loss.

The invention more particularly relates to the sweating of solder from automobile radiators or other objects with which solder is ordinarily used. "Sweating" will be understood in this connection to connote sufficient heating of easily fusible constituents such as solder until it runs whereby to separate it from higher melting point metals with which it may be associated.

Generally, the invention contemplates a method of sweating by which the heat may be maintained at a constant desirable intensity through the utilization of radiant heat concentrated in a confined sweating zone while simultaneously maintaining a non-oxidizing atmosphere within said zone to prevent loss or devaluation of metal through oxidation. In addition, provision is made for the extrication of fused metal entrained in or on objects with which the lower melting point metals may be associated. Apparatus is provided for effectively carrying out the process.

According to one form of apparatus for practising the invention, a furnace of refractory or insulated material is provided, within which are suitably located a plurality of electrically heated elements positioned to form a tunnel like sweating zone heated primarily and substantially entirely by radiant heat rays as distinguished from heat of convection or conduction. A traveling conveyor or movable foraminous hearth is provided for transporting objects to be sweated through the sweating zone and shaker means are provided in the path of travel of said conveyor which imparts to said objects intensive vibration or up and down motion resulting in sharp impacts to jar loose fused metal and separate it from said objects. In addition, means are provided for reversing the position of objects being sweated whereby more effectively to extricate entrained fused metal. Suitable mechanism to facilitate proper charging and discharging are provided all of which is described more in detail hereinafter.

In addition to the new and novel features of operation and the new and original arrangements and combinations of steps in the process, the invention also consists in certain new and original features of construction and combinations of parts forming the apparatus.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a fragmentary side view in elevation of the apparatus;

Fig. 2 is a front view in elevation;

Fig. 3 is a transverse view on line 3—3 of Fig. 1;

Fig. 4 is a fragmentary side view in section showing the charging end of the furnace on line 4—4 of Fig. 3;

Fig. 5 is a fragmentary side view in section showing the discharge end of the furnace;

Fig. 6 is a transverse view on line 6—6 of Fig. 5;

Fig. 7 is a fragmentary view in perspective showing in part the arrangement of the heating elements;

Fig. 8 is a fragmentary view in perspective showing in part the arrangement of the conveyor and shaking means;

Fig. 9 is a transverse view on line 9—9 of Fig. 5;

Fig. 10 is a fragmentary view in perspective showing in part a form of charging mechanism;

Fig. 11 is a fragmentary side view in section of the furnace showing a modified arrangement;

Fig. 12 is a fragmentary view in perspective showing in part a modified form of charging mechanism; and Fig. 13 is a wiring diagram.

Certain specific apparatus in which the process may be carried out is hereinafter described for purposes of illustration but it is to be understood that various details will be identified in the specification and claims by specific name for convenience and not by way of limitation, it being further understood that the terms herein are intended to be as generic as the art will permit.

To facilitate explanation the apparatus will be described with reference to sweating solder from scrap automobile radiators but it will be apparent as the description proceeds that other objects may be treated in like manner for like purposes.

Referring now to the drawings in which like reference characters denote like parts, 10 represents the furnace in which an endless conveyor 11 is suitably located to carry objects through the sweating zone. The furnace is comprised of a plurality of sections A, B, C, D and E each of which has a lower or base part and a removable upper or cover part. The sections are connected to form an enclosed chamber having suitable charging and discharging openings. The sections are made of sheet metal of suitable gauge spaced apart and insulated with mineral wool 12. Other insulating material may be used if desired.

The base part of the front section D comprises side walls 13 and 14 and floor 15. The front section D is provided with an auxiliary door 16 swingable on hinges 17. A charging platform 18 is provided which is the roof of the upper part of the front section. The upper part or cover of the front section is provided with a charging chamber 19 having a charging port 20 leading from said charging platform 18. A door 21 is provided for the charging port 20. It is movable by a treadle 22 connected with a pivoted lever 23 and a cable 24 over suitable pulleys 25 and 26 mounted on a frame. This mechanism will be described further in detail hereinafter in connection with the operation of the conveyor and charging mechanism.

A plurality of intermediate sections A, B and C are connected in tandem with the front section D. A typical intermediate section may be described as comprised of a base part 27 making up side walls 28, 29 and floor 30, a removable cover part 31 forming upper side walls 32, 33 and roof 34 (see Fig. 6). It will be observed that the intermediate sections are designed to fit with the front section to define a sweating chamber 35.

Disposed within each intermediate section is a bank 36 of electrical heating elements 37. The heating elements 37 may be made by winding a suitable coiled heat resistance wire 38 about suitable heat resisting core 39. Wire known as Nichrome V has proved to be very satisfactory. The ends of the wires may be connected to bus bars 40 as indicated in the wiring diagram (Fig. 13) in which three banks of coils a, b and c corresponding to sections A, B and C of the furnace are shown connected with a three phase power line.

The heating elements are mounted on slotted carriers 41 fixed to the furnace by brackets 42 on the upper surface of the side walls of the base part of the various intermediate sections A, B and C. Rods 430 assist in maintaining the heating element carriers in alignment. It will be observed that the three banks of heating elements a, b and c define substantially a tunnel like zone. The inner surface 43 of the roof of the sweating chamber 35 comprising the cover parts of the intermediate sections is a reflector which is preferably a polished metal surface. It is shaped to reflect heat rays from the coils 37 within a confined space thus producing a sweating zone 44 of concentrated radiant heat within the furnace through which the conveyor 11 travels.

The rear section E is comprised of upper part or cover 45 and a lower part or base 46 making up side walls 47 and 48, and floor 49. The rear section is provided with inclined discharge chute 50 having a discharge opening 51 closable by a door 52 swingable on hinges 53. A second conveyor 92 of endless screen 54 mounted on drum shafts 55 and 56 is disposed within the rear section for purposes described hereinafter.

The main conveyor 11 may be in the form of a pair of endless belts 57 made up of a multiplicity of chain links 58 and 59. This pair of belts is maintained in suitable parallel spaced relationship by cross bars 60 connected with link arms 61 fixed to links 59. The parallel link belts are arranged to be located over sprockets 62 mounted on shafts 63 and 64 which are supported in the side walls of the furnace in suitable journals 65.

A plurality of baskets or trays 66 are connected to the cross bars 60 spaced at equal intervals throughout the length of the endless parallel link belts 57. The trays are connected to the cross bars by means of connector links 67 and slotted links 68 which are mounted on axles 69 and 70, as shown more particularly in Fig. 8. Wheels or rollers 71 are mounted on said axles and are adjusted to ride on parallel spaced trackways 72 and 73 fixed to the side walls of the furnace. The trays or baskets 66 are generally square or rectangular in shape, made up of side walls 74 and 75 and having a foraminous bottom 76 which might be termed a travelling hearth.

Wheels 71 ride on trackways 72 and 73 and carry the major part of the weight when the trays are loaded. Sets of wheels 77 mounted on axles 78 and 79 opposite axles 69 and 70 ride on trackways 80 and 81 and carry the major part of the load of the baskets when they are traveling empty in the lower part of the furnace, as shown in Figs. 4, 5 and 6.

Toward the rear of the upper trackways 72 and 73 are located a pair of saw tooth shaped tracks 82 and 83 in parallel spaced relation one on either side of the furnace in the path of travel of the lower sets of wheels 71. It will be observed that the baskets 66 when they reach this part of the sweating zone, when the conveyor is traveling, are given a very marked up and down jolting action.

The main conveyor 11 travels in the direction indicated by the arrows 84 and 85. It is caused to travel by means of a motor 86 provided with a variable speed driving pulley 87 and belt 88 which is connected through speed reducer 89 with drive chain 90 mounted on sprocket 91 which in turn is fixed to the shaft 64.

The second conveyor 92 travels on drums fixed to shafts 55 and 56 which are suitably journaled in journals 93. This conveyor is caused to travel in the direction of the arrow 94 through a second drive chain 95 traveling on sprocket 96 fixed to shaft 64 and sprocket 97 fixed to shaft 55. In operation, the lineal speed of the conveyor is preferably greater than that of the main conveyor 11.

The charging chamber 19 may be provided with radiator supporting wings 98 and 99 fixed on shafts 100 and 101 respectively rotatably mounted one on each side of the charging chamber walls by brackets 102. The opposite wings 98 and 99 are arranged to operate synchronously by means of sprockets 103 and 104 fixed to shafts 100 and 101 respectively and sprockets 105 and 106 fixed to shafts 107 and 108 driven by link chains 109 and 110. Cog wheels 111 and 112 intermeshed as shown in Figs. 3 and 10 are mounted on shafts 107 and 108 which are in turn rotatably mounted in the rear wall 113 of the charging chamber. The wings 98 and 99 are caused to operate each in the same manner at the same time. A trip lever 114 pivoted to pin 115 fixed to the side wall of the furnace and having a hook portion 116 registering with slot 117 in wing 99 is arranged to be actuated through its opposite end 118 by means of a trip finger 119, one being fixed to each of the trays 66. Counter weights 120 and 121 maintain the wings 98 and 99 in horizontal position when there is no load on the wings. Hook 116 serves likewise to maintain the wings in horizontal position when any weight such as a radiator to be sweated is placed on the wings, as indicated by radiator 122 in dot and dash lines Fig. 4.

It will be observed that the trip lever is actuated by the trip finger 119 when the conveyor is traveling and if there is a radiator of sufficient weight to over-balance the effect of the counter weights 120 and 121 the wings will allow the radiator to fall only in the basket, inasmuch as the hook will maintain the wings in horizontal position unless actuated by the trip finger 119.

Suitable troughs 123 having closable discharge spouts 124 are located beneath the sweating zone 44 for collection of fused solder. An auxiliary collection trough 125 is provided beneath the surface of the second conveyor 92 for catching fused solder which does not drop out in the sweating zone proper.

The sweating furnace may be operated continuously as follows: The power is turned on through suitable switches (not shown) and the coils will assume a glowing temperature. By thermostatic control the temperature within the heating zone may be regulated to any desired constant temperature necessary effectively to sweat solder from the radiators. The conveyors are put into operation by means of motor 86 and the speed may be regulated through a variable speed driving pulley 87. A very desirable range of temperatures within the sweating zone when ordinary automobile radiators are sweated has been found to be 750° F. to 925° F. With proper adjustment of the speed of travel of the main conveyor the solder may be sweated off radiators effectively in about four to five minutes without "burning" the copper making up the fins of the radiator.

A charging operator may stand on operator's platform 126 having at hand an available supply of scrap radiators. By means of the foot treadle 22 he may open charging port door 21 and quickly slide a radiator into charging chamber 19. The radiator will normally rest on the wings 98 and 99. The door will close automatically by reason of its weight when the operator's foot is removed from the treadle. The conveyor being in motion, the trip finger 119 will automatically actuate the hook 116 through the lever 118. It will be observed that the wings are tripped only when a conveyor tray is directly beneath the wings 98 and 99 in charging chamber 19, hence the radiator falls within the tray.

The loaded tray proceeds into the tunnel like sweating zone 44 and meantime another radiator is placed into the charging chamber on the wings 98 and 99. The next tray following trips the wings as previously described and this tray is loaded with a radiator which proceeds through the sweating zone. This operation is carried on continuously each tray as it passes the charging chamber being loaded with a radiator to be sweated.

As the radiators pass through the sweating zone they are heated to sweating temperature primarily and substantially entirely by radiant heat as distinguished from convection or conduction. When the loaded trays travel toward the rear end of the sweating zone there is imparted to them vigorous up and down jolting impacts by reason of the travel of the carrying wheels 71 over the saw tooth tracks 82 and 83. Slots in the links 68 permit easy travel of the trays over the shafts 63 and 64 at the ends of the furnace. Supporting drums 127 fixed to shafts 63 and 64 assist in carrying the weight of the trays when they are reversing their direction of travel.

The vigorous shaking imparted to the radiators cause the melted solder to separate and fall through the foraminous bottoms of the trays into the collection troughs 123 where the molten solder is discharged if desired through the spouts 124 into moulds where it is permitted to solidify into desirable shapes.

It has been found in practice that often a part of the fused metal becomes entrained in the interstices of the radiators, even after vigorous shaking. To recover this entrained solder the radiator is given a complete tumble to turn it upside down after the shaking action. This is accomplished by carrying the tray over the sprocket shafts 64 where the radiator is cast upside down on to the second conveyor 92. This turning over jolts the entrained metal and effectually extricates it whence it falls into the auxiliary tray 125 and is removed as desired. The remaining part of the radiator comprising copper strips, which ordinarily are in the form of accordion pleated strips, bronze, brass or other metallics is then carried on conveyor 92 to the discharge chute where it may be discharged into a water bath if desired and handled by means well known.

It will be observed also that the doors are normally closed and opened only at intervals for short periods of time and without substantial agitation or circulation of the air, hence the air or atmosphere within the chamber is kept in a relatively quiescent state and such oxygen as may be in the chamber originally is consumed and free air introduced is of such negligible quantity as to have no appreciable oxidizing effect on the radiators being sweated.

The modified form of charging chamber mechanism as shown in Fig. 12 operates in the same manner as that previously described. However, the supporting wings 200 and 201 are provided which completely close the space between the sweating chamber of the furnace and the charging chamber 19. By this means the sweating chamber may be closed from the atmosphere while the charging door 21 is open. Otherwise, this mechanism is similar to that more particularly shown in Fig. 10.

In the modified form of conveyor and track arrangement shown particularly in Fig. 11, the rear ends of the trays are not fixed to the cross bars 60 by slotted links but are free. Hence, when the trays reach the rear end of the furnace and are carried over sprocket shaft 64 the tray is given a whip cracking motion or thrust which imparts to the radiators in the tray a very effective impact against the second conveyor. A pair of curved track sections 300, one on each side of the furnace, catch the upper wheels 77 of the free ends of the trays and guide them onto tracks 80 and 81 in the lower part of the furnace.

It has been found in practice that it may be desirable to maintain a reducing atmosphere in the sweating chamber during the sweating operation, or, at least, an atmosphere which is not conducive to oxidation. This may be accomplished in several ways. An inert gas, such as for example, carbon dioxide, may be charged into the sweating zone to replace oxygen carrying air. In certain instances this may be impractical. Preferably, some material, such as for example, charcoal or the like which has an affinity for oxygen, particularly when heated by glowing radiant heat, may be inserted in the sweating chamber. A very small quantity of cheap charcoal simply sprinkled upon the radiators as they are charged into the furnace eliminates oxidation of the metals and completely eliminates dross formation upon the separated solder. No oxides are carried away by flue gases as no combustible fuel is used to generate sweating temperatures.

It is seen from the foregoing description that our process is simple in operation. It is exceedingly successful in results in that the solder reclaimed is of substantially the same composition as when originally used, there being no dross formation or appreciable loss through oxidation. The copper recovered is not "burned" by reason of its contact with combustion gases because it is a primary purpose of the invention to sweat radiators by radiant heat as distinguished from conduction or convection and to maintain them out of contact with fuel combustion gases which invariably contaminate the metallic materials. As a result of the type of heat and the temperatures at which the process may be effectively operated the recovered copper sheet material is maintained in its flexible state and is not burned or rendered brittle. Hence, it demands a higher price than is the case where the metal is burned or contaminated by hot combustion gases.

Power costs are kept exceedingly low by the arrangement of the electrical heating coils associated with the polished reflector shaped to reflect and concentrate radiant rays in a confined sweating zone where sufficient agitation is imparted to jar loose fused metal. Not only is the initial cost of the apparatus low but, as well, its operation is surprisingly economical. When considered in the light of the exceedingly high quality of metallics reclaimed and the efficiency of recovery on a commercial scale, the invention effects results heretofore desired but not accomplished.

This application is a continuation in part of our copending applications Serial No. 693,074 filed October 11, 1933, and Serial No. 740,424 filed August 18, 1934.

While certain novel features of the invention have been disclosed and are pointed out in the annexed claims, it will be understood that various omissions, substitutions and changes may be made by those skilled in the art without departing from the spirit of the invention.

What is claimed is:

1. The process of sweating radiators to recover the solder which comprises passing said radiators horizontally through a heated zone generated by direct and reflected rays from electrical heating elements mounted above the path of travel of said radiators, maintaining a reducing atmosphere in said heated zone by the use of a material which has a great affinity for oxygen, heating said radiators in said heated zone sufficiently to melt said solder, shaking said radiators while said solder is molten and finally tumbling said radiators with a whip cracking motion whereby to effectively separate said solder from the higher melting point metals of said radiators and cause it to fall by gravitation and collecting said separated solder beneath the path of travel of said radiators through said heated zone.

2. The method of reclaiming copper from scrap radiators which comprises passing said radiators through a confined space heated electrically by direct and reflected rays of radiant heat from above the course of travel of said radiators, heating said radiators to a temperature sufficiently high to melt the solder affixed to the copper of said radiators, intermittently jarring said radiators in their course of travel through said space whereby to separate solder from said copper, and finally tumbling said radiators while the remaining solder thereon is still molten whereby to extricate the solder entrained in the interstices of said radiators while maintaining said copper when heated out of contact with fuel combustion gases and at a temperature well below its melting point whereby to prevent the separated copper from being rendered brittle.

3. The process of treating scrap radiators to separate solder from the sheet copper of said radiators which comprises continuously passing said radiators in a generally horizontal direction through a sweating zone heated substantially entirely by radiant heat from electric heating coils and substantially free from fuel combustion gases, said sweating zone being maintained at a temperature of sufficient intensity to melt the solder during the course of travel of said radiators through said sweating zone, imparting to said radiators a vertical jarring motion while the solder is molten, then tumbling said radiators over completely with forceful impact while the solder adhering thereto is still molten whereby to separate entrained solder from said copper and separately collecting said solder and copper.

4. The process of treating scrap radiators to separate the solder therefrom which comprises passing said radiators progressively in a generally horizontal direction through a sweating zone heated substantially entirely by radiant heat generated by electric heating means, heating said radiators sufficiently high to melt only the solder, maintaining in said zone a reducing atmosphere by the introduction into said sweating zone of a material having a great affinity for oxygen whereby to prevent oxidation of the copper of said radiators and the formation of dross on said solder, imparting to said radiators an up and down jarring motion in their course of travel through said sweating zone whereby to separate at least a part of the molten solder, and subsequently while the solder entrained in the interstices of said radiators is still molten substantially instantaneously turning over said radiators whereby to impart thereto an impact of sufficient intensity to effectually extricate said entrained solder.

5. Apparatus for recovery of solder from scrap radiators which comprises an insulated chamber, electrical heating coils within said chamber and positioned in the upper portion thereof, a traveling conveyor through said chamber for carrying said radiators containing recoverable solder and positioned below said heating coils, a reflector adapted to concentrate the heat derived from said heating means upon a confined area within the chamber, said reflector constituting a longitudinal arch over radiators carried on said conveyor and parallel with their direction of travel, said heating coils being capable of heating said radiators sufficiently high to melt said solder by radiant heat without materially heating the radiators by the transfer of heat by convection or conduction, means coactive with said conveyor for vigorously vibrating said radiators while heated, means including a second conveyor spaced below and at the delivery end of said first conveyor for forcefully receiving radiators dropped from the first conveyor for causing a forceful impact when said radiators while heated are tumbled whereby to extricate molten solder entrained in the interstices of said radiators.

6. Apparatus for separating lead or alloys of lead from metals of higher fusion point which comprises a chamber within walls of refractory material, electrical heating elements within said chamber and positioned in the top thereof, a conveyor in said chamber below said heating elements for carrying objects containing the lead or alloys, and a reflector about said heating elements shaped to reflect heat rays from said heating elements on to said objects, said reflector being comprised of polished metal arranged about said heating elements and constituting a longitudinal arch over and parallel with the direction of travel of objects carried through said chamber, said heating elements being adapted to give off sufficient radiant heat to melt said lead or alloys without appreciably heating said lead or alloys by convection or conduction.

7. An apparatus for separating and reclaiming lead or alloys of lead from metals or alloys of higher melting point which comprises a heating chamber having openings at opposite ends, doors to substantially close said openings, an endless conveyor passing through said chamber, electric heating coils within said chamber and above said endless conveyor, shaker means in the path of travel of said conveyor to vibrate objects carried thereon, a reflector within said chamber adapted to reflect heat rays from said heating elements upon said objects passing through said chamber on said conveyor, means including a tray pivotally connected at one end to the conveyor and free at the other end for imparting to said radiators a tumbling action with a whip cracking action when the solder adhering to said radiators is molten and a receptacle for collecting molten metal beneath said conveyor.

8. A furnace for reclaiming solder from scrap radiators which comprises an outer metal casing, a metal wall within said outer casing and separated therefrom by insulating material and forming a chamber having openings at opposite ends, electrical heating coils within the upper portion of said chamber, a conveyor beneath said coils for transporting radiators through said chamber, said metal wall having a polished surface adapted to reflect heat rays from said heating elements upon radiators passing through said chamber, and a trough within said furnace for collecting solder separated from said radiators.

9. An apparatus for recovering solder from scrap radiators comprising an insulated heating chamber having openings at opposite ends, doors to close said openings, said doors hinged at the top to said chamber and substantially closing said openings when in normal position, a plurality of electrical heating coils positioned longitudinally in the outer portion of said chamber, a polished metal reflector about said heating coils and forming longitudinal walls of said heating chamber, a metal casing about said insulated chamber adapted to strengthen said apparatus, a conveyor passing through said chamber for carrying radiators, said reflector being shaped to reflect heat rays upon radiators transported on said conveyor, and a trough beneath said conveyor for collecting solder melted from said radiators.

10. A radiator sweating furnace comprising an outer casing of good refractive qualities, a reflector within said casing forming a chamber having openings for the passage of radiators through said furnace, a plurality of electrical heating coils adjacent said reflector, said heating coils positioned to form a tunnel-like sweating zone and adapted to heat said radiators substantially entirely by radiant energy, a conveyor passing through the lower portion of said chamber for transporting radiators, means for vigorously jarring said radiators in their course of travel on said conveyor and means for inverting said radiators with forceful impact while the solder adhering thereto is molten to separate solder entrained in the interstices of said radiators and a trough for collecting liquid solder separated from said radiators.

11. Apparatus for sweating radiators to recover solder therefrom which comprises a charging chamber, a sweating chamber connected to said charging chamber, a plurality of electrical heating elements disposed longitudinally in the upper part of said sweating chamber to fuse solder on said radiators, a reflector surface about said heating elements and adapted to deflect radiant heat rays from said elements into a confined horizontal tunnel-like sweating zone within said sweating chamber, said zone being substantially defined by said heating elements, a conveyor passing through said sweating zone for transporting radiators to be sweated, means in the path of travel of said conveyor for jarring said radiators and means including trays fixed only at their forward ends to said conveyor for imparting to them a whip cracking motion to extricate and separate molten solder, and a trough to collect solder separated from said radiators.

12. In a furnace for recovering solder and sheet copper from radiators, a charging chamber having a charging port and mechanism mounted therein for supporting radiators, a sweating chamber connected to said charging chamber, a traveling hearth mounted on a main conveyor passing under said mechanism and through said sweating chamber for transporting radiators, said travelling hearth having means to actuate said radiator supporting mechanism to discharge radiators therefrom onto said conveyor in a predetermined place, electrical heating elements disposed within said sweating chamber adjacent said conveyor and adapted to generate sufficient heat to sweat solder from said radiators, means within the path of travel of radiators through said sweating chamber for vigorously vibrating radiators being sweated to separate molten solder from said copper, means including said main conveyor for tumbling said radiators with forceful impact after said radiators are subjected to vigorous vibration on said main conveyor, a trough for collecting said molten solder, and a second conveyor to discharge said copper from said furnace.

13. Apparatus for separating normally integral constituents of scrap radiators comprising means defining a substantially closed chamber, electrical heating means for heating the atmosphere within said chamber, means for transporting radiators through said chamber including a carriage and a guide track for said carriage, said track having an irregularly shaped carriage-guiding surface constituting means for imparting a vibrating movement to said carriage, said transporting means including means for inverting said radiators after said carriage has traversed said track.

14. In apparatus for sweating radiators having therein a sweating zone maintained at sweating temperature substantially entirely by radiant heat from glowing electrical heating coils and substantially free from fuel combustion gases, a conveyor comprising a pair of endless link belts, members transverse of the path of travel of said belts fixed to said belts and maintaining them in parallel relation, a plurality of trays between said belts for transporting radiators through said zone, wheels mounted on axles fixed to the respective corners of said trays, links connecting said axles to said transverse members, said links having slots receiving said axles respectively to allow play of said trays and parallel notched tracks for said wheels whereby to cause jarring action of said trays in their path of travel.

15. In a furnace for sweating radiators including a sweating zone substantially free from fuel combustion gases and maintained at sweating temperature by radiant heat and a continuous conveyor passing through said sweating zone, a charging mechanism comprising a pair of opposite wings mounted in said furnace above said conveyor, means including counter-weights for maintaining said wings in horizontal position when there is no load on said wings, and means including a trip finger mounted on said conveyor and a lever coactive with said trip finger and mounted on an inner side wall of said furnace for maintaining said wings in horizontal position when there is a load on said wings and for tripping said wings to permit radiators placed thereon to be discharged therefrom on to said conveyor when said lever is actuated.

16. In apparatus for sweating radiators, a charging chamber, a sweating chamber connected to said charging chamber, said sweating chamber having positioned therein electrical heating coils defining a tunnel-like sweating zone, a conveyor passing through said zone, and charging mechanism comprising a pair of radiator supporting members, counter-weights maintaining said members in radiator supporting position when there is no load on said members, trip fingers mounted on said conveyor and a lever coactive with said fingers and mounted on a wall of said charging chamber for maintaining said radiators in radiator supporting position when there is a load thereon and for tripping said radiator supporting members to cause radiators placed thereon to be discharged therefrom on to said conveyor when said fingers trip said lever.

17. A furnace for sweating radiators which comprises a chamber within walls of refractory material, electrical heating elements within said chamber and positioned in the top thereof, a conveyor in said chamber below said heating elements for carrying radiators, and a reflector about said heating elements to reflect heat rays on to said radiators, said heating elements being adapted to give off sufficient heat to melt the solder of said radiators without appreciably heating said solder by convection or conduction, and said conveyor comprising a pair of endless belts spaced equidistant apart, cross bars connecting said belts for maintaining them in parallel spaced relationship, a plurality of trays having foraminous bottoms positioned between said belts for transporting radiators through said sweating chamber, axles transverse of the path of travel of said conveyor connected to said trays at their forward and rearward ends, links connecting the axles at the forward end of each tray and at the rearward end of the immediately preceding tray with one of said cross bars and wheels mounted on said axles adapted to ride on a pair of fixed parallel notched tracks whereby to impart a vibratory motion to heated radiators on said trays in their path of travel.

18. A furnace for sweating radiators which comprises a chamber within walls of refractory material, electrical heating elements within said chamber and positioned in the top thereof, a conveyor in said chamber below said heating elements for carrying radiators, and a reflector about said heating elements to reflect heat rays on to said radiators, said heating elements being adapted to give off sufficient heat to melt the solder of said radiators without appreciably heating said solder by convection or conduction, and said conveyor comprising a pair of endless belts spaced equidistant apart, a plurality of trays in tandem position between said belts, a cross bar transverse of the path of travel of said trays and positioned between the forward end of each tray and the rearward end of the next preceding tray and connecting with said belts to maintain them in parallel spaced relation, axles connected to the respective corners of said trays, the axles at the forward end of each tray being connected to a cross bar by links and the axles at the rearward end of the next preceding tray being connected by slotted links to the last mentioned cross bar and wheels mounted on said axles adapted to ride on a pair of fixed parallel notched tracks whereby to impart a vibratory motion to said trays in their course of travel.

19. The method of sweating radiators which comprises establishing a zone of relatively quiescent atmosphere, heated substantially entirely by radiated and reflected heat generated by electrical heating means in the absence of combustion gases, maintaining said zone at a temperature sufficient to melt only predetermined relatively low temperature fusion constituents of the radiators, introducing said radiators into said zone and manipulating said radiators to free them of the melted constituents, said manipulating consisting of vigorously jarring said radiators in said zone while the low temperature fusion constituents are molten and finally turning said radiators over completely with forceful impact while the low temperature fusion constituents adhering thereto are still molten whereby to extricate and separate said constituents entrained in the interstices of said radiators.

20. The method of sweating radiators which comprises establishing a tunnel-like zone of substantially quiescent gaseous medium heated principally by radiant heat from electrical coils, maintaining said zone at a temperature sufficient to melt the lower melting point metals of the radiators but insufficient to produce appreciable melting or oxidation of the higher melting point metals, introducing said radiators into said zone, agitating said radiators in their course of travel through said zone to separate at least a part of the melted metals and finally tumbling said radiators upside down with forceful impact whereby to separate the remaining molten metals adhering thereto entrained in the interstices of said radiators.

LEROY S. FLECK.
ALVIN A. MANSBACH.